US010462510B2

(12) United States Patent
Begeja et al.

(10) Patent No.: US 10,462,510 B2
(45) Date of Patent: *Oct. 29, 2019

(54) METHOD AND APPARATUS FOR AUTOMATICALLY CONVERTING SOURCE VIDEO INTO ELECTRONIC MAIL MESSAGES

(71) Applicant: AT&T Intellectual Property II, L.P., Atlanta, GA (US)

(72) Inventors: Lee Begeja, Gillette, NJ (US); David Crawford Gibbon, Lincroft, NJ (US); Zhu Liu, Marlboro, NJ (US); Robert Edward Markowitz, Glen Rock, NJ (US); Bernard Simon Renger, New Providence, NJ (US); Behzad Shahraray, Freehold, NJ (US); Gary Lee Zamchick, Tenafly, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,747

(22) Filed: Dec. 11, 2015

(65) Prior Publication Data
US 2016/0100209 A1    Apr. 7, 2016

Related U.S. Application Data

(60) Continuation of application No. 13/609,896, filed on Sep. 11, 2012, now Pat. No. 9,253,519, which is a
(Continued)

(51) Int. Cl.
*H04N 21/266* (2011.01)
*H04N 7/173* (2011.01)
(Continued)

(52) U.S. Cl.
CPC ... *H04N 21/26603* (2013.01); *H04N 7/17318* (2013.01); *H04N 21/23418* (2013.01);
(Continued)

(58) Field of Classification Search
CPC ............ H04N 21/2225; H04N 21/231; H04N 21/232; H04N 21/47202; H04N 21/4755;
(Continued)

(56) References Cited

U.S. PATENT DOCUMENTS 5,237,648 A  *  8/1993  Mills ................... G11B 27/028
                                                                 345/474
5,614,940 A  *  3/1997  Cobbley ................ H04N 5/265
(Continued)

FOREIGN PATENT DOCUMENTS

CA         2320568        3/2001
EP         1146739        10/2001
(Continued)

OTHER PUBLICATIONS

"Choosing Your Next Handheld", Handheld Computing Buyer's Guide, Fall 2001, Issue 3.
(Continued)

*Primary Examiner* — Benjamin R Bruckart
*Assistant Examiner* — Anthony Bantamoi
(74) *Attorney, Agent, or Firm* — Chiesa Shahinian & Giantomasi PC

(57) ABSTRACT

The invention relates to a method and system for automatically identifying video content within source video and transmitting the video content to an electronic mail client. The transmitted video content can be streaming video, video files, and/or other medium derived from the source video. An enhanced electronic mail client is also disclosed.

14 Claims, 11 Drawing Sheets

Related U.S. Application Data continuation of application No. 11/513,459, filed on Aug. 31, 2006, now Pat. No. 8,296,811, which is a division of application No. 10/325,830, filed on Dec. 23, 2002, now abandoned, which is a continuation-in-part of application No. 10/034,679, filed on Dec. 28, 2001, now abandoned.

(60) Provisional application No. 60/296,436, filed on Jun. 6, 2001, provisional application No. 60/282,204, filed on Apr. 6, 2001.

(51) Int. Cl.
    H04N 21/258    (2011.01)
    H04N 21/482    (2011.01)
    H04N 21/63     (2011.01)
    H04N 21/81     (2011.01)
    H04N 21/234    (2011.01)

(52) U.S. Cl.
    CPC ..... H04N 21/25891 (2013.01); H04N 21/482 (2013.01); H04N 21/4828 (2013.01); H04N 21/632 (2013.01); H04N 21/812 (2013.01)

(58) Field of Classification Search
    CPC .. H04N 7/17336; H04N 5/76; H04N 7/17318; H04N 21/4147
    See application file for complete search history.

(56) References Cited

U.S. PATENT DOCUMENTS

| | | |
|---|---|---|
| 5,664,227 A | 9/1997 | Mauldin et al. |
| 5,708,767 A | 1/1998 | Yeo et al. |
| 5,710,591 A | 1/1998 | Bruno et al. |
| 5,805,763 A | 9/1998 | Lawler et al. |
| 5,821,945 A | 10/1998 | Yeo et al. |
| 5,835,087 A | 11/1998 | Herz et al. |
| 5,835,667 A | 11/1998 | Wactlar et al. |
| 5,864,366 A | 1/1999 | Yeo |
| 5,874,986 A | 2/1999 | Gibbon et al. |
| 5,956,026 A | 9/1999 | Ratakonda |
| 5,999,985 A | 12/1999 | Sebestyen |
| 6,038,296 A | 3/2000 | Brunson et al. |
| 6,061,056 A * | 5/2000 | Menard ............... H04N 5/4401 348/E5.108 |
| 6,092,107 A | 7/2000 | Eleftheriadis et al. |
| 6,098,082 A | 8/2000 | Gibbon et al. |
| 6,166,735 A | 12/2000 | Dom et al. |
| 6,233,389 B1 | 5/2001 | Barton et al. |
| 6,236,395 B1 | 5/2001 | Sezan et al. |
| 6,243,676 B1 | 6/2001 | Witteman |
| 6,282,549 B1 | 8/2001 | Hoffert et al. |
| 6,289,346 B1 | 9/2001 | Milewski et al. |
| 6,304,898 B1 | 10/2001 | Shiigi |
| 6,324,338 B1 | 11/2001 | Wood et al. |
| 6,324,388 B1 | 11/2001 | Souctinav |
| 6,324,512 B1 | 11/2001 | Junqua et al. |
| 6,345,279 B1 | 2/2002 | Li et al. |
| 6,363,380 B1 | 3/2002 | Dimitrova |
| 6,385,306 B1 | 5/2002 | Baxter et al. |
| 6,415,327 B1 | 7/2002 | Beckerman et al. |
| 6,453,355 B1 | 9/2002 | Jones et al. |
| 6,460,075 B2 | 10/2002 | Krueger et al. |
| 6,477,565 B1 | 11/2002 | Daswani et al. |
| 6,477,707 B1 | 11/2002 | King et al. |
| 6,496,857 B1 | 12/2002 | Dustin et al. |
| 6,564,263 B1 | 5/2003 | Bergman et al. |
| 6,564,383 B1 * | 5/2003 | Combs ............... H04N 7/163 348/465 |
| 6,671,715 B1 | 12/2003 | Langseth et al. |
| 6,678,890 B1 | 1/2004 | Cai |
| 6,748,421 B1 | 6/2004 | Ozkan et al. |
| 6,810,526 B1 | 10/2004 | Menard et al. |
| 6,847,778 B1 * | 1/2005 | Vallone ............... G06F 3/04847 386/205 |
| 6,956,573 B1 | 10/2005 | Bergen et al. |
| 6,961,954 B1 | 11/2005 | Maybury et al. |
| 6,970,915 B1 | 11/2005 | Partovi et al. |
| 7,111,009 B1 | 9/2006 | Gupta et al. |
| 7,130,790 B1 | 10/2006 | Flanagan et al. |
| 7,149,964 B1 | 12/2006 | Cottrille et al. |
| 7,178,107 B2 | 2/2007 | Sezan et al. |
| 7,200,857 B1 * | 4/2007 | Rodriguez ........... H04N 21/235 375/E7.024 |
| 7,313,808 B1 * | 12/2007 | Gupta et al. ......... H04N 7/173 725/89 |
| 2001/0013123 A1 | 8/2001 | Freeman et al. |
| 2001/0049826 A1 | 12/2001 | Wilf |
| 2001/0052019 A1 * | 12/2001 | Walters ................ G06Q 30/06 709/231 |
| 2002/0016972 A1 | 2/2002 | Ogawa |
| 2002/0038456 A1 | 3/2002 | Hansen et al. |
| 2002/0052747 A1 | 5/2002 | Sarukkai |
| 2002/0078466 A1 | 6/2002 | Beyda |
| 2002/0093591 A1 | 7/2002 | Gong et al. |
| 2002/0100046 A1 * | 7/2002 | Dudkiewicz .......... H04N 7/163 725/46 |
| 2002/0138843 A1 | 9/2002 | Samaan et al. |
| 2002/0152464 A1 | 10/2002 | Kitsukawa et al. |
| 2002/0152477 A1 | 10/2002 | Goodman et al. |
| 2002/0173964 A1 | 11/2002 | Reich |
| 2003/0163815 A1 | 8/2003 | Begeja |
| 2004/0117831 A1 | 6/2004 | Ellis et al. |
| 2004/0261095 A1 | 12/2004 | Sezan et al. |
| 2004/0268389 A1 | 12/2004 | Sezan et al. |
| 2005/0028194 A1 * | 2/2005 | Elenbaas ........... G06F 17/30787 725/32 |
| 2005/0076357 A1 | 4/2005 | Fenne |
| 2005/0076378 A1 | 4/2005 | Omoigui |
| 2005/0223408 A1 | 10/2005 | Langseth et al. |
| 2005/0278741 A1 | 12/2005 | Robarts et al. |
| 2006/0212921 A1 | 9/2006 | Carr |
| 2007/0277201 A1 | 11/2007 | Wong |
| 2008/0216140 A1 | 9/2008 | Liwerant |

FOREIGN PATENT DOCUMENTS

| | | |
|---|---|---|
| WO | 9627840 | 9/1996 |
| WO | 9807103 | 2/1998 |

OTHER PUBLICATIONS

Raggett, D., "Getting Started with VoiceXML 2.0", http://www/w3.org/Voice/Guide/, Sep. 17, 2002, pp. 1-4, 6-8, and 10.

Windows Media Player 7 Multimedia File Formats web page—http://support.microsoft.com/default.aspx?scid=/support/mediaplayer.wmptest/wmptest.asp., Dec. 23, 2002, pp. 1-6.

"Periodic", Webster's II New College Dictionary, 1995, pp. 1-67.

"Relevant", Webster's II New College Dictionary, 1995.

"Calculate", Webster's II New College Dictionary, 1995, pp. 1-5.

Pseudo web page—http://www.pseudo.com, pp. 1-3.

Medium4.com web page—http://www.medium4.com, p. 1.

Yahoo finance vision web page—http://vision.yahoo.com, pp. 1-2.

Shahrary, B., "Scene Change Detection and Content-Based Sampling of Video Sequences," Proc. SPIE 2419, Digital Video Compression: Algorithms and Technologies, Feb. 1995, pp. 2-13.

Shahraray, B., et al., "Multimedia Processing for Advances Communications Services," in Multimedia Communications, F. De Natale and S. Pupolin editors, Springer-Verlag, 1999, p. 510-523.

Gibbon, D., "Generating Hypermedia Documents from Transcriptions of television Programs Using parallel Text Alignment," in Handbook of Internet and Multimedia Systems and Applications, Borko Furht Editor, CRC Press 1998., pp. 1-17.

Huang, Q., "Automated Generation of News Content Hierarchy by Integrating Audio, Video and Text Information," Proc. IEEE International Conference on Acoustics, Speech and Signal Processing ICASSP '99, Phoenix Arizona, May 1999, pp. 3025-3028.

(56) References Cited

OTHER PUBLICATIONS

Shahraray, B., "Multimedia Information Retrieval Using Pictorial Transcripts," in Handbook of Multimedia Computing, Borko, Furht Editor, CRC Press 1998, pp. 1-16.
The FeedRoom web page—http://www.feedroom.com, p. 1.

* cited by examiner

YOUR CUSTOM VIDEO INFORMATION SERVICE

INSTANT CLIP SEARCH: — 410

[                    ]  [FIND AND PLAY]

USE COMMAS TO SEPARATE TERMS (e.g.: CHELSEA, BILL CLINTON)

FROM: — 415
[ALL SOURCES ▼]

◉ YOUR eCLIPS PROFILE SEARCH FOR OCTOBER 30, 2001

| TOPICS FOUND: | # OF CLIPS | SOURCE |
|---|---|---|
| AT&T | 8 | CUSTOM |
| POLITICS | 10 | CUSTOM |
| JAY LENOS WHITE H... | 2 | CUSTOM |
| SPORTS | 6 | CUSTOM |

405

[PLAY ALL CLIPS] — 420      [ADD A NEW TOPIC] — 425

(HOME) — 430
(PROFILE) — 435
(ARCHIVE) — 440
(LOGOUT) — 445

METHOD AND APPARATUS FOR AUTOMATICALLY CONVERTING SOURCE VIDEO INTO ELECTRONIC MAIL MESSAGES

This application is a continuation of non-provisional application Ser. No. 13/609,896 filed Sep. 11, 2012, which is a continuation of nonprovisional application Ser. No. 11/513,459 filed Aug. 31, 2006 and issued as U.S. Pat. No. 8,296,811 on Oct. 23, 2012, which is a divisional application of nonprovisional application Ser. No. 10/325,830 filed Dec. 23, 2002, which is a is a continuation-in-part of nonprovisional application Ser. No. 10/034,679 which was filed on Dec. 28, 2001, and claims priority to provisional application 60/282,204 which was filed Apr. 6, 2001, and to provisional application 60/296,436 which was filed Jun. 6, 2001, all of which are hereby incorporated by reference in their entireties.

BACKGROUND OF THE INVENTION

Field of the Invention

The invention relates to the delivery of multimedia assets to a user. More specifically, the invention relates to a method and system for automatically identifying and transmitting video content to an electronic mail client.

Description of the Related Art

There exists an increasing amount of information available in video format from a variety of sources. Known systems and methods for searching video content rely on a search of titles or other metadata to identify entire video broadcasts or video files of potential relevance to a user. Once identified, video content is delivered to the user via conventional methods for distribution of the video source. For example, a content provider manually directs video content to a user over closed circuit television, mails a video tape to a user, or manually generates an electronic mail (email) message with an attached video file.

Known systems and methods for identifying and delivering video content have various disadvantages. For example, since known systems and methods for searching video typically identify entire video broadcasts or video files that are of interest to a user, a user may need to sort through a relatively large volume of irrelevant information to view a relatively small amount of relevant content. In addition, the manual labor associated with delivery of video content to a user may result in delay and/or increase the cost of delivery.

Thus, there exists a need for systems and methods that identify video source material relevant to the interests of a user, and transmit only those portions of the source video containing relevant content to the user in an efficient manner.

SUMMARY OF THE INVENTION

The invention relates to a method and system for automatically identifying and transmitting video content to an electronic mail client.

In one exemplary embodiment, the invention relates to a method for arranging for delivery of content from a video source, including: automatically identifying a portion of at least one source video stream using a predetermined user profile; transforming the identified portion of the at least one source video stream into a destination medium; and automatically building an electronic mail message based on the destination medium and the identified portion of the at least one source video.

In another embodiment, the invention provides a method for arranging for the delivery of content from a video source, including: automatically identifying a portion of at least one source video stream based on relevance to a predetermined user profile; transforming the identified portion of the at least one source video stream into at least a thumbnail image and closed caption text; and automatically building an electronic mail message using the thumbnail image and the closed caption text.

In another embodiment, the invention provides a system for arranging the delivery of content to an electronic mail client, including: at least one video source; a user profile database; and a server coupled to the video source and the user profile database, wherein the server is configured to read profile data from the user profile database, automatically identify a portion of the at least one video source using the profile data, transform the identified portion of the at least one video source into a destination medium, and automatically build an electronic mail message using the destination medium.

In another embodiment, the invention provides a computer-readable storage medium configured to provide a graphical user interface for an electronic mail client, the graphical user interface including: a management feature for managing a plurality of electronic mail messages based on metadata, wherein the metadata includes at least one of broadcast source, broadcast date and duration information related to at least one corresponding source video for each of the plurality of electronic mail messages; and a view feature for viewing a selected portion of the at least one corresponding source video and a medium derived from a selected portion of the at least one corresponding source video.

In another embodiment, the invention provides a method for creating an electronic mail message for delivery of video information to a user including: selecting video information from at least one source video stream using user profile information; formatting the selected video information in accordance with the profile information; and populating fields of an electronic message with formatted video information and destination information in accordance with the user profile information.

The features and advantages of the invention will become apparent from the following drawings and detailed description.

BRIEF DESCRIPTION OF THE DRAWINGS

The invention is described with reference to the accompanying drawings. In the drawings, like reference numbers indicate identical or functionally similar elements. Additionally, the left-most digit of a reference number identifies the drawing in which the reference number first appears.

FIG. 4 is an exemplary page view of a page viewed by a user utilizing a client according to one embodiment of the invention.

DETAILED DESCRIPTION

Figure 1:
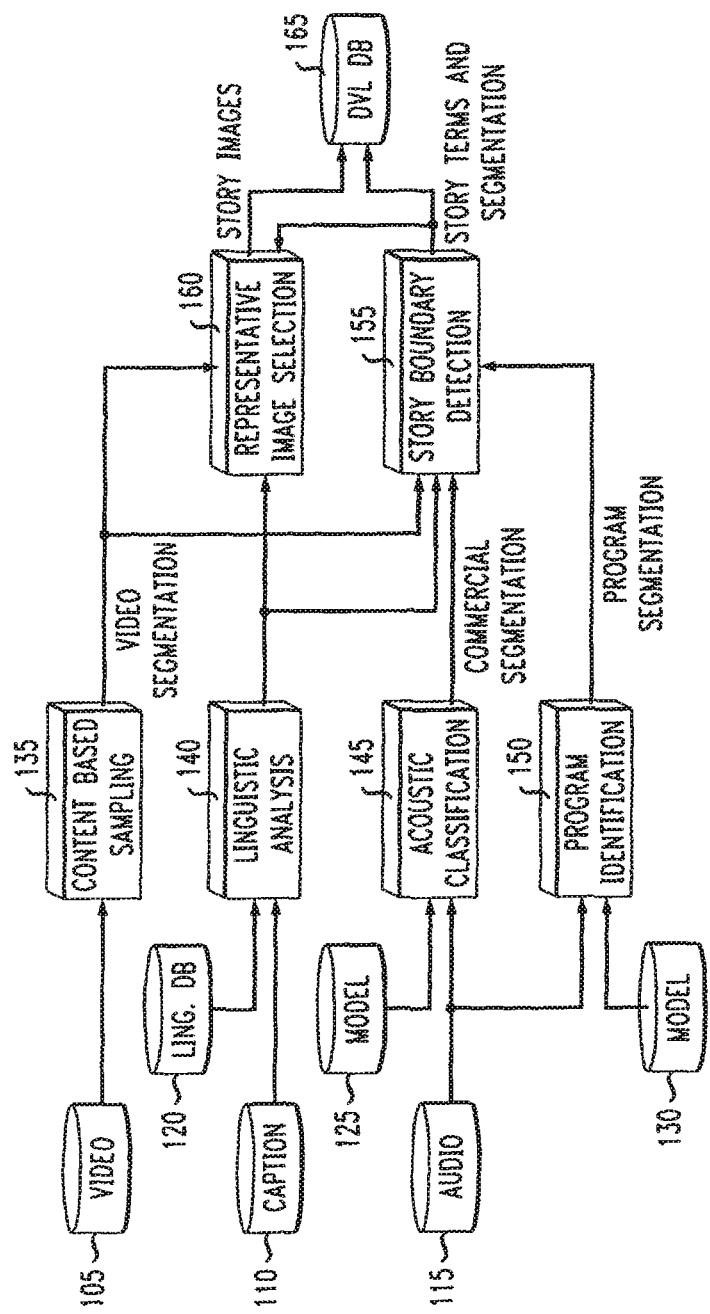
FIG. 1 demonstrates an exemplary methodology for media processing according to one embodiment of the invention.

While the invention is described below with respect to various exemplary embodiments, the invention is not limited to only those embodiments that are disclosed. Other embodiments can be implemented by those skilled in the art without departing from the spirit and scope of the invention.

The invention solves the above-discussed problems and provides a personalized, customizable multimedia delivery service that is convenient and easy to use. In one embodiment of the invention, the service works by recording all of the video streams of appropriate source and interest to a target audience. For example, the service may record content from a collection of (or a particular one of) sports or news channels on television. In another example, the service may record content related to training videos, presentations or executive meetings in a business, school or other particularized environment. Recording may occur as the content is originally being broadcast (i.e., live), afterwards from recorded media, or even before the content is broadcast to its intended audience.

Once the content is captured and recorded, it can be segmented, analyzed and/or classified, and thereafter stored on a platform. For example, the content can be broken down into its component parts, such as video, audio and/or text. The text can include, for example, closed caption text associated with the original transmission, text generated from an audio portion by speech recognition software, or a transcription of the audio portion created before or after the transmission. In the latter case, it becomes possible to utilize the invention in conjunction with executive speeches, conferences, corporate training, business TV, advertising, and many other sources of video which do not typically have available an associated textual basis for searching the video.

Having obtained or generated the text, it can then be used as a basis for searching the multimedia content. In particular, the text provides the basis for an exemplary methodology for overcoming the above-identified problems associated with searching video in the prior art. That is, if a user wishes to search the stored content for video segments relevant to the President of the United States discussing a particular topic, then the President's name and the associated topic can be searched for within the text associated with the video segments. Whenever the President's name and the associated topic are located, an algorithm can be used to determine which portion of an entire video file actually pertains to the desired content and should therefore be extracted for delivery to the user. Thus, if a video file comprises an entire news broadcast about a number of subjects, the user will receive only those portions of the broadcast, if any, that pertain to the President and the particular topic desired. For example, this could include segments in which the President talks about the topic, or segments in which another talks about the topic and the President's position.

Once the pertinent segments of the broadcast have been appropriately extracted, for a given user, they can be stitched together for continuous delivery to that user. In this way, for example, the segments can be streamed to the user as a means of providing an easy-to-use delivery methodology for the user, and as a means of conserving bandwidth. Users can view the delivered multimedia asset in its entirety, skip between the assets, or view only portions of the assets, as they desire. Moreover, a user can have access to portions of the original video file that occurred immediately before or after the extracted segments; for example, the user could choose to watch the entire original video file. Such access can be granted by including a "more" or "complete" button in a user interface.

In one embodiment of the invention, a profile of the user is stored which specifies criteria for searching available multimedia assets. The criteria may include, for example, key words and/or phrases, a source(s) of the content, etc. The profile can be set directly by the user via interaction with an appropriately designed graphical user interface (GUI). When such a profile is available, the invention is capable of automatically searching the available assets on a periodic basis, and thereafter extracting, combining and delivering the compiled assets (or segments thereof, regardless of their original source) to the user. In one embodiment, the invention can be utilized such that a service platform assisting in implementing the invention notifies the user whenever new multimedia assets consistent with the user's profile have been prepared. In another embodiment, the invention may automatically deliver multimedia assets in accordance with a user's profile according to a predetermined schedule, such as hourly or daily. Alternatively, the invention may notify the user of the presence of desired video clips, rather than actually deliver those clips.

The assets can be classified and indexed on-the-fly as they are received. In this way, the assets can be compared against (he user's profile virtually in real-time, so that results can be provided to the user (and the user can be notified) whenever they become available. Furthermore, a user can provide criteria for a search or searches beyond those set in the user's profile.

The identified assets can be delivered to the user in a variety of manners. For example, delivery may occur via cable or satellite television, or directly to a personal computer. The invention can be practiced via a plurality of platforms and networks. For example, the invention may be practiced over the Internet to reach a large consumer audience, or it may be practiced over an Intranet to reach a highly targeted business or industry target.

In one embodiment, the invention allows video streaming of identified video clips. Video streaming (i.e., allowing the viewing of a video clip as it is downloaded rather than only after it is downloaded, which speeds the viewing process and largely obviates the need for video storage at the user location) is a communications technique that is growing in popularity with the increasing availability of both video players (especially for use with personal computers) and bandwidth to the average consumer. However, no conventional service allows users to accurately and quickly find desired clips for playing, and do not provide a ready means for providers to profit from the video streams that are provided.

When streaming the identified video clips, users may receive only those video clips identified by a search executed on the user's behalf. However, if a user desires, he or she may also choose to view an entire program from which the clip(s) was extracted. A user may also be allowed to choose some or all of the video clips for long-term storage, whereby the clip(s) can be archived for later use. In one embodiment, the user may store the clips at a local computer, and thereafter make the clips available to other users connected via a peer-to-peer network.

In another embodiment, the invention allows improved video-on-demand (VOD). VOD is typically defined in the cable/satellite television arena as the ability to request programming at any time and to have VCR-like controls over the content being streamed to the TV. The invention adds value to conventional VOD by allowing the user to demand video more accurately and completely.

An extension to VOD is personal video recorder (PVR) technology, which allows even more control over TV programs being viewed. Current PVR implementations are offered by TiVo and ReplayTV, and allow users great flexibility in storing programs for later viewing and/or manipulation in viewing (e.g., skipping over commercials in a television program). The invention provides a searching tool for allowing users to find interesting programs, even from a variety of channel sources, to thereafter be recorded and viewed using PVR technology.

Moreover, whereas conventional PVR records only entire programs based on a user's directions, the invention permits the recording of only those portions of programs that the user desires. In this regard, the invention contemplates recording the desired portions either by doing so directly from the program, or by recording the entire program locally and then utilizing only those portions of the program desired by the user.

Having described various exemplary embodiments of the invention, it should be noted that the terms "video file," "video input," "video," "video program" or any similar term refers generically to any analog or digital video information, including any content associated therewith, such as multimedia content, closed caption text, etc. The terms "clip," "video clip," "electronic clip" or "eClip" should be understood to refer to any subsection of a video program that is selected based on a user search criterion. Also, the terms "extracting," "parsing," "removing," "accessing" or any similar term with respect to a video file refers to the use of a selected portion of the video file. Such use may include literal removal (permanent or temporary) from the context of a larger file, copying of the selected portion for external use, or any other method for utilizing the selected portion.

Based on the above-described features of the invention, a user may accurately, completely and promptly receive multimedia assets that he or she finds interesting, and may conveniently exploit the received assets in a manner best-suited to that user.

FIG. 1 demonstrates an exemplary methodology for media processing in a digital video library (DVL) according to one embodiment of the invention. Such media processing is used in implementing the invention at a user level, by capturing, segmenting and classifying multimedia assets for later use and manipulation. It should be noted that the media processing implementation of FIG. 1 and discussion of associated concepts are provided in greater detail in the following documents, which are hereby incorporated herein by reference; Shahraray B., "Scene Change Detection and Content-Based Sampling of Video Sequences," Proc. SP1E 2419, *Digital Video Compression: Algorithms and Technologies*, pp. 2-13, February 1995; Shahraray B., Cox R., Haskell B., LeCun Y., Rabiner L., "Multimedia Processing for Advanced Communications Services", in *Multimedia Communications*, F. De Natale and S. Pupolin Editors, pp. 510-523, Springer-Verlag, 1999; Gibbon D., "Generating Hypermedia Documents from Transcriptions of Television Programs Using Parallel Text Alignment," in *Handbook of Internet and Multimedia Systems and Applications*, Borko Furht Editor, CRC Press 1998; Shahraray B. "Multimedia Information Retrieval Using Pictorial Transcripts," in *Handbook of Multimedia Computing*, Borko Furht Editor, CRC Press 1998; and Huang Q., Liu Z., Rosenberg A., Gibbon D., Shahraray B., "Automated Generation of News Content Hierarchy By Integrating Audio, Video, and Text Information," Proc. IEEE International Conference On Acoustics, Speech, and Signal Processing ICASSP'99, pp. 3025-3028, Phoenix; Arizona, May 1999.

In FIG. 1, multimedia assets including video 105, associated text captions 110 and corresponding audio portions 115 are imported into the system for processing. Content-based sampling engine 135 receives the video 105 and segments it into individual shots or video frames; this information will be combined with information extracted from the other components of the video program to enable the extraction of individual stories (i.e., video segments related to a particular topic or topics), as will be described. Additionally, this process allows a representative image for a particular story, segment or clip to be selected by engine 160; and second, the process allows boundaries around the story, segment or clip to be set by engine 155.

A database 120 of linguistic rules is used by linguistic analysis engine 140 to combine the caption information 110 with the segmented video within engines 155 and 160, to thereby assist in the functionality of those two engines. Similarly, information within model databases 125 and 130 is used by acoustic classification engine 145 and program identification engine 150 to provide segmentation/identification of commercials and programs, respectively. Once the multimedia asset(s) have been captured, segmented and classified as described above, they can be stored thereafter in DVL database 165.

All of the information from engines 135-150 is utilized in engines 155 and 160 to discern a length of a particular video story or clip that will be associated with each topic. In particular, for example, multimodal story segmentation algorithms such as those described in "Automated Generation of News Content Hierarchy By Integrating Audio, Video, and Text Information" (above) can be used to determine an appropriate length of a video clip to be associated with a particular topic. Similarly, the algorithm can be used in conjunction with the user profile to either compare the profile information to newly-acquired content on-the-fly, or to similarly determine an appropriate length for a video clip to be associated with a particular portion of the user profile.

As referred to above, textual information used to identify clips of interest can be derived, for example, from closed caption text that accompanies most television programs. Real-time closed captioning typically lags behind the audio and video by a variable amount of time from about 1 to 10 seconds. To take this factor into account, the embodiment of FIG. 1 is capable of using speech processing to generate very accurate word timestamps.

When closed caption text is not available, a large vocabulary automatic speech recognition system can be used to generate a transcript of the audio track. While the accuracy of the automatically generated transcripts is below that of closed captions, they provide a reasonable alternative for identifying clips of interest with reduced, but acceptable, accuracy. Alternatively, a parallel text alignment algorithm can be used to import high quality off-line transcripts of the program when they are or become available.

Figure 2:
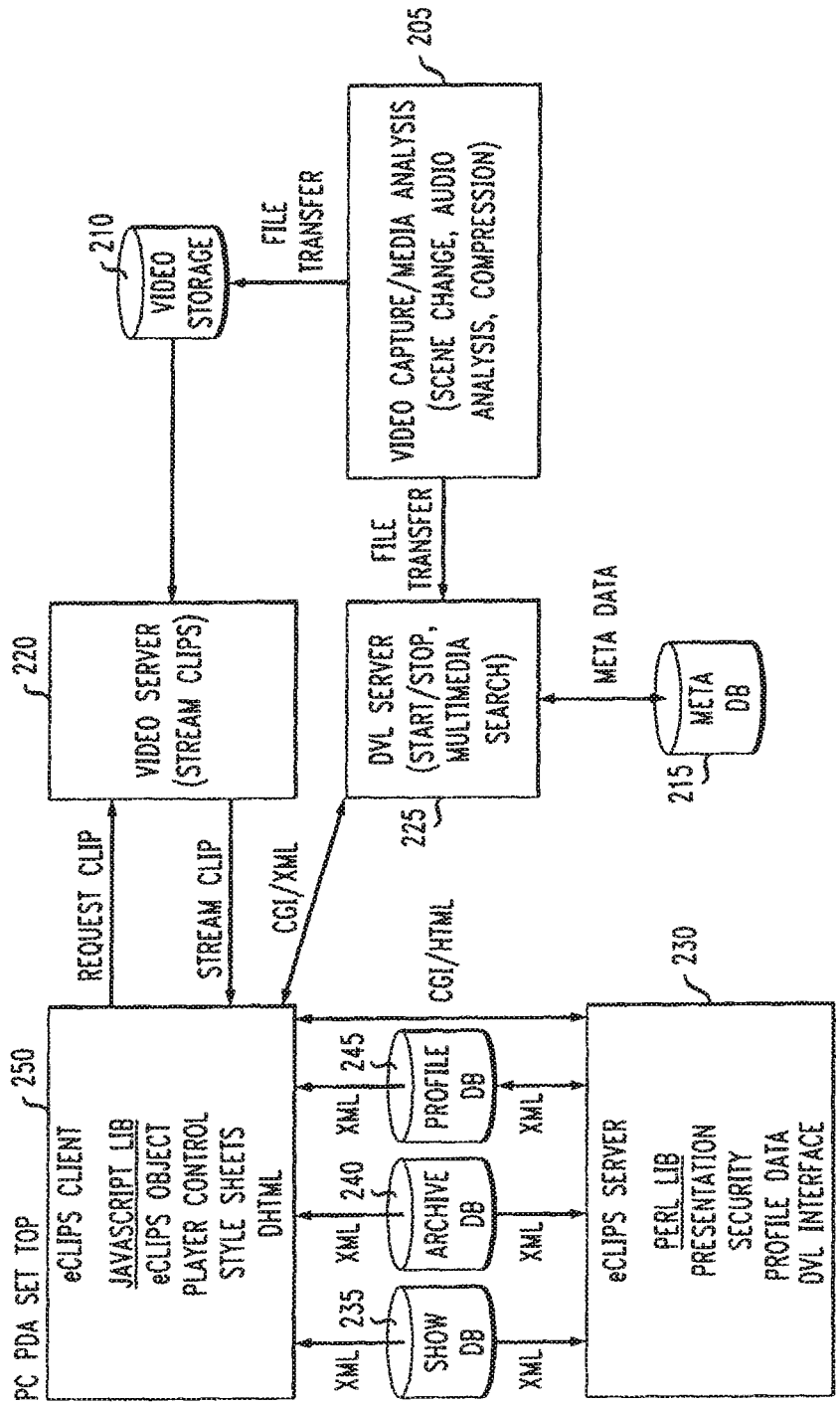
FIG. 2 illustrates an architecture for implementing an exemplary embodiment of the invention.

FIG. 2 implements an architecture for implementing an exemplary embodiment of the invention. It should be noted that the architectural elements discussed below can be deployed to a user and/or provider of multimedia assets in whole or in part, and therefore each element interfaces with one another and external components using standard, conventional interfaces.

In FIG. 2, Video Capture/Media Analysis component 205 records and compresses broadcast TV programming. Also at component 205, various functions can be performed on the content such as scene change detection, audio analysis, and compression. These video files are shipped to the Video Storage database 210 from which they will be served when the video is streamed to the client 250.

Associated metadata is shipped to the Metadata database 215. Note that thumbnail images are included as part of the metadata, as well as terms and/or phrases associated with a clip(s) for categorizing the clip(s) within a topical subset. Typically, this video capture/media analysis process need not occur in real time. However, there is no reason why it could not occur in real time if an operator so desires and wishes to devote sufficient computational resources. In any case, it is not necessary to wait until a show is completed before indexing and searching that show.

Video Server 220 responds to clip requests and makes the video content available to the client 250. For example, the video server 220 may download the video clips in whole or in part, stream the clips (e.g., via MPEG4 ASF or MPEG2) to the client 250 or generate the clip metadata discussed above (such as terms and/or phrases associated with a clip for categorizing the clip within a topical subset).

DVL Server 225 handles query requests (such as how many clips are available, which shows have clips, etc.) anchor clip content requests (metadata that describes clip content including "clip pointer" to video content). Thus, it handles multimedia search (such as closed caption text) and determines the start and stop times of the clips, which are designated with "clip pointers," as just mentioned.

eClips server 230 handles client requests for web pages related to a service for providing eClips. eClips server 230 utilizes Perl Common Gateway Interface (CGI) scripts that the client navigates in order to perform the functions of the eClips service. For example, the scripts deal with login/registration related pages, home page, profile related pages, archive related pages, player pages, and administration related pages. Player scripts can be launched in a separate window. Each CGI request from the client 250 will return HTML with HTML DIVs, JavaScript, and CSS style sheets. The DIVs and CSS style sheets are used to position the various elements of the page. DHTML is used to dynamically load DIV content on the fly (for instance, a list of shows in an instant search pull down performed by a user).

In FIG. 2, three databases 235, 240 and 245 are shown as Extensible Markup Language (XML) databases. Thus, Perl scripts can be utilized to access (i.e., read from and/or write to) these databases via XML. Specifically, these three databases include show database 235, which contains information about recorded broadcasts. Profile database 245, which contains personal search terms and/or phrases, and Archive database 240, which contains saved clip information (e.g., entire clips or simply clip pointers).

eClips Client 250, in one embodiment, includes a JavaScript that each Perl script includes in the HTML that is returned from the eClips server 230. It is through the JavaScript that the client 250 interacts with the DVL server 225 to determine the desired content and through JavaScript that the client initiates the streaming content with the video server 220. The JavaScript also accesses (reads) the Show and Profile XML files in those databases.

The Video Server 220 may have a separate IP host name, and should support HTTP streaming. The DVL and eClips servers 225 and 230 may have the same IP host name, and may be collocated within a single machine.

In FIG. 2, the key interactions that cause video to be streamed to the client 250 are demonstrated. In a home page view, a user has logged in already and should see a list of topics determined by their profile, as well as the number of clips for each topic. An example of a topic could be "sports" and the keyword string associated with this topic could be football, baseball, hockey. The keyword string is used to search the CC text (in this case, clips that have any of these terms will be valid).

When the home page is loaded, JavaScript will send a CGI query to DVL server 225, which generates an XML response. The XML is parsed into JavaScript variables on the client using the XML document object model (DOM). The CGI query and XML response is implemented as part of the DVL system and acts as a layer above an Index Server, which, as part of the DVL server 225, performs text indexing of the video clips (as discussed above) that allows the user to locate a desired clip. The XML response will include the number of clips found for each topic. It is with these query responses that the home page knows which topics have hits and can activate the links to play the content.

These JavaScript links, when clicked, can launch the player page in a separate window. When the player page is loaded, essentially the same JavaScript can be used to recalculate the number of clips for each topic. In principle, this could be changed to calculate this only once and to pass this on to the player script thereafter. The JavaScript may also run a query to get the list of shows with clips for a particular topic. The JavaScript then loops through all the shows with hits and queries the DVL server via the separate CGI script to get the clip information needed to play the clip. This information is also returned via XML and parsed via the JavaScript. The JavaScript loads various DIVs that depend on this information, such as hit search term found in CC text, CC text, and thumbnail. Finally, the player page JavaScript starts the media player with the first clip using a pointer (start time) to the video. It should be noted that, in one embodiment of the invention, the just-described process is almost completely automated, so that dynamic clip extraction occurs when a clip is selected, and a show automatically starts and will play completely through if not interrupted by the user.

In the architecture shown in FIG. 2, eClips client 250 may reside on, for example, a user's home or business computer, a personal digital assistant (PDA), or a set-top box on a user's television set. Client 250 interacts with eClips server 230 as discussed above to provide the user with an interface for viewing and utilizing the video clips. Client 250 can be written to contain, for example, a JavaScript object that contains profile results (eClips object). A user using eClips client 250 running on a PC may access stored clips through a network, such as the Internet or a locally defined Intranet.

In one embodiment, the user defines a search criterion, either through an "instant search" feature or within a user profile. When multiple clips are found matching the user search, the clips can be stitched together and streamed to the user as one continuous program. In another embodiment, eClips server periodically searches for clips matching a given user's profile, and makes the clips available to the user, perhaps by notifying the user via email of the availability of the clips.

The architecture shown in FIG. 2 allows for video to be stored and displayed in several formats including MPEG2 (e.g., for digital television and video on demand) and MPEG4 (e.g., for streaming video on the Internet). As mentioned above, the video may be stored for later use by the user; in particular, a user may archive some or all of the received video and thereafter permit searching and uploading of the video from storage by other members of a peer-to-peer computer network.

Figure 3:
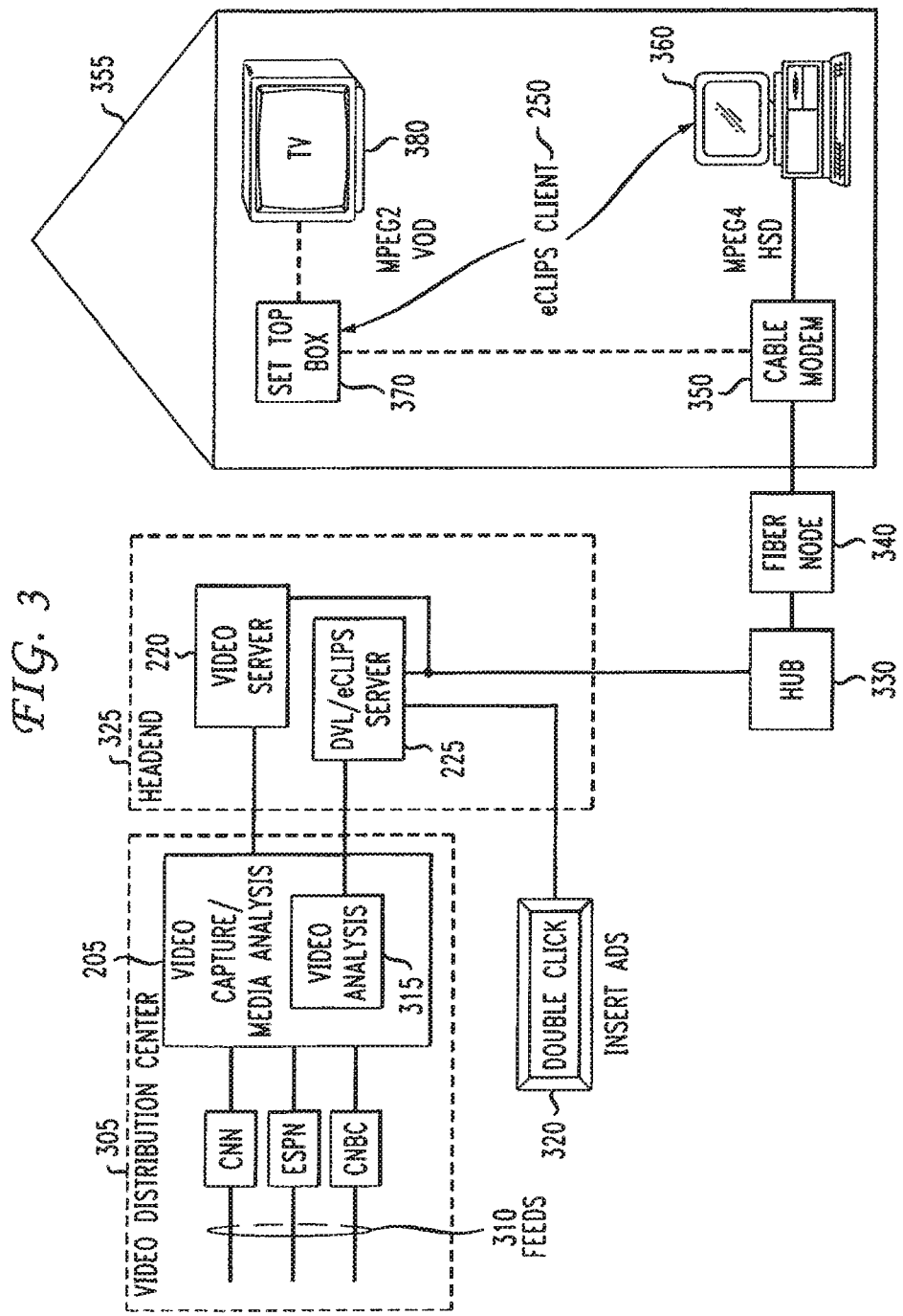
FIG. 3 demonstrates a more specific hardware architecture according to another exemplary embodiment of the invention.

FIG. 3 demonstrates a more specific hardware architecture according to another exemplary embodiment of the invention. In FIG. 3, video feeds 310 are received through various sources (such as television channels CNN, ESPN and CNBC) at Video Capture/Media Analysis component 205 within Video Distribution Center 305. Component 205 receives the feeds and forwards captured/analyzed results to video server 220 and/or DVL/eClips server 225/230 within cable Headend 325. In FIG. 3, video analysis portion 315 is illustrated within component 205, although it should be understood from FIG. 2 and the associated discussion above that component 205 may perform other media analysis such as audio analysis. The DVL/eClips servers 225/230 operate as described above in conjunction with FIG. 2 to deliver, using, for example, Hybrid Fiber Coaxial (HFC) connections, all or part of the video feeds to routing hub 330, and then through fiber node 340 to cable modem 350 located within user home 355. Additional marketing and advertising (such as a commercial placed between every third clip stitched together) could be tied into the video stream in one embodiment of the invention at the Headend from providers 320 such as DoubleClick.

Within user home 355 the feed is received at cable modem 350 via high speed data line (HSD) to a PC 360 running eClips client 250. Alternatively, the feed could be sent to Set top box 370 atop TV 380, where Set top box 370 runs eClips client 250. In the example where the video clips are received via cable modem 350, the service can be streamed as high speed data (HSD) through a cable modem as MPEG4 video. When the video is received via Set top box 370, it can be delivered as MPEG2 over video on demand (VOD) channels that could be set up in advance for a service providing the invention.

FIG. 4 is an exemplary page view of a page viewed by a user utilizing an eClips client according to one embodiment of the invention. In FIG. 4, for example, the user might see page view 400 just after logging in to a system implementing the invention. In page view 400, section 405 demonstrates the results of a profile search performed for the user on a given day, or over some other pre-defined period, according to the previously stored profile of that user. In section 405, clips are listed both by topic and by number of clips related to that topic. In section 405, the user therefore has the option of viewing one or more of the clips related to a particular topic.

Section 405 also identifies a source for the criteria used to select the various topical clips. More specifically, on a profile page, a user can select default sources (shows) which will be searched based on the user's profile; this is referred to as a "Main" list, and would restrict any profile topic that has the Main option to search only those shows selected on the profile page. On a topic editor page, where a user is allowed to add or modify topics for searching, the user can specify this Main list, or can make Custom selections that are only valid for a particular search topic. In section 405, the user has selected the latter option, and so a "source" is shown as Custom.

In section 410, the user additionally has the option of entering new search terms and/or phrases not related to his or her current profile, whereby the invention searches a clips database via DVL server as described above with respect to FIG. 2. Section 415 indicates the media sources which will be searched for the terms or phrases entered in section 410.

Also, in page view 400, button 420, "Play all clips," allows a user to view all currently available clips with one click. The user can add a new topic using button 425. The user can return to a home page by clicking on button 430 (although this option is only valid when the user is on a page different from the home page 400 itself), access his profile via button 435 and access an archive of previously saved clips via button 440. Finally, a user can log out of the service using button 445.

Figure 5:
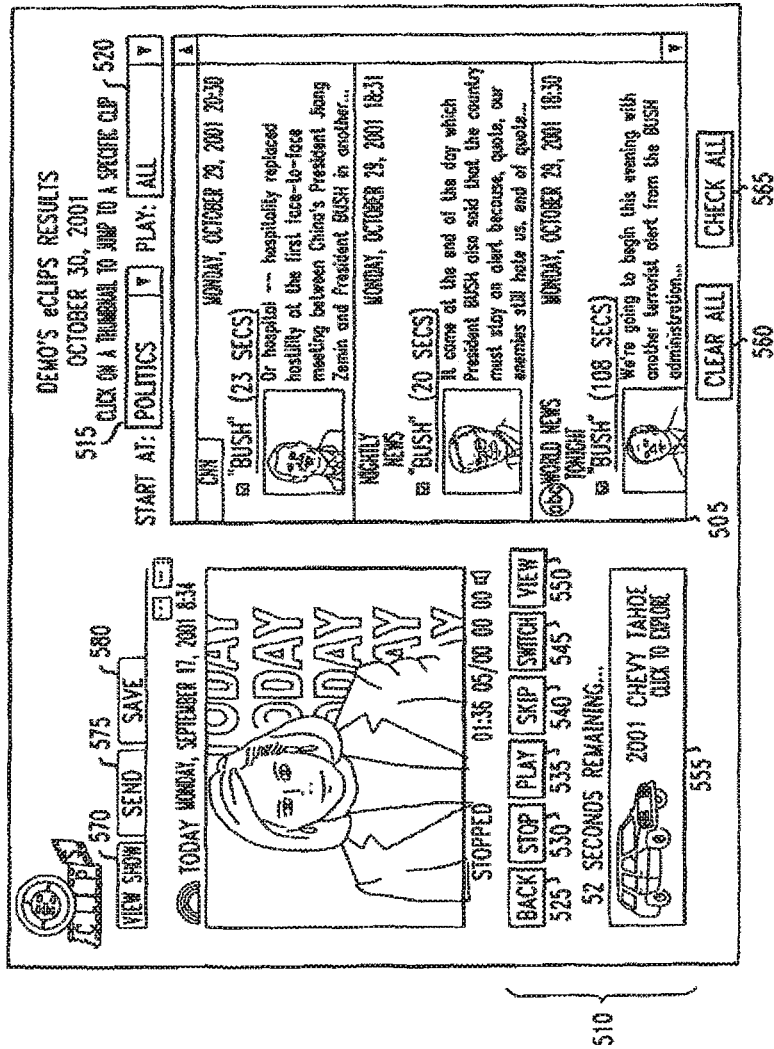
FIG. 5 demonstrates a page view showing a content retrieval page according to the exemplary embodiment shown in FIG. 4.

FIG. 5 demonstrates a page view 500 showing a content retrieval page according to the exemplary embodiment shown in FIG. 4. In section 505, still frames of the beginning of each clip (i.e., thumbnails) within a topic can be viewed by the user. Section 505 can be controlled by section 515, which allows the user to select a topic of clips to be shown, as well as section 520, which allows a user to select a portion of the clips from that topic that will be played. With buttons 560 and 565, a user may clear or select all of the clips being shown within a particular topic.

When one or more of these clips is chosen for viewing by the user, that clip is shown in section 510. Section 510 can be controlled by buttons 525-550, which allow a user to skip to a previous clip with button 525, stop the clip with button 530, play the clip with button 535, skip the clip with button 540, switch to a new topic of clips with button 545 or view footage after the selected clip(s) with button 550. Note that section 510 may also include advertisements 555, and may display a time remaining for a currently playing clip, a source of the clip, and a date and time the clip was originally broadcast.

In one exemplary embodiment of the invention, page 500 will play all of the clips currently available in a predetermined order (e.g., reverse chronological order, by source of content, etc.) if the user does not choose a specific topic or clip. Button 570 is activated when a user wants to view the clip(s) available; i.e., as shown in view 500. Button 575 allows the user to send (e.g., email) the clip(s) to another user, and button 580 allows the user to save the clip(5) to an archive (i.e., the archive accessed by button 440 in FIG. 4).

Having discussed various exemplary embodiments of the invention and associated features thereof, as well as potential uses of the invention, the following provides a more detailed summary of application categories in which the invention is of use.

Generally speaking, because the invention can capture content from nearly any multimedia source and then use standard streaming media to deliver the appropriate associated clips, it is nearly limitless in the markets and industries that it can support.

As a practical matter, the invention can be packaged to address different market segments. Therefore, it should be assumed that the target markets and applications supported could fall into, for example, any or all of the Consumer, Business-to-Consumer or Business-to-Business Marketplaces. The following discussion summarizes some exemplary application categories.

First, as a consumer offering, the invention can be provided as an extension to standard television programming. In this model, an ISP, Cable Programming Provider, Web Portal Provider, etc., may allow consumers to sign up for this service, or the set of features provided by the invention can be provided as a premium subscription.

In the consumer service model, a consumer would enter a set of keywords and/or phrases in the profile. In addition, as part of the preferences selected in the profile the user may determine that only specific content sources should be monitored. As the user profile is created or changed it would be updated in the user profile database. As video content is captured in the system, the user profile database is matched against the closed caption text. As an example, a consumer may be interested in sports but only want to see the specific "play of the day." In this scenario, the consumer would enter the key words "play of the day" and then identify in the profile the specific content sources (channels or programs) that should be recorded/analyzed by the invention. For example, the consumer could choose channels that play sports games or report on sports news. When the consumer returns from work that evening, a site or channel for accessing the invention would be accessed. This consumer would then see all of the clips of programs that matched the keywords "play of the day," meaning that this consumer would see in one session all of the content and clips matching that set of words.

As another example, in a Business-to-Consumer offering, the invention can be provided as an extension to standard television programming. In this case, both the programming and its sponsorship would be different from the consumer model above. For example, a corporate sponsor or numerous corporate sponsors may offer specific types of content, or may offer an assemblage of content overlaid with advertising sponsorship. The sponsorship would be evident in the advertising that would be embedded in the player or in the content, since the design of the invention is modular in design and allows for customization.

In the Business-to-Consumer service model, a consumer would enter a set of keywords in the profile. As the user profile is created or changed it would be updated in the user profile database. Because this model and the content provided would be underwritten by corporate sponsorship, the content provided may be limited to a proprietary set of content As an example, if CNN were the sponsor of the service, all of the content provided may be limited to CNN's own broadcasts. In addition, it may be very evident to the consumer that the service is brought to them by CNN in that the CNN logo may be embedded in the user interface, or may be embedded in the content itself.

Next, as a Business-to-Business offering, the invention can be used in intra-company applications as well as extra-company applications. The applications supported include, as just a few examples: Business TV, Advertising, Executive Announcements, Financial News, Training, Competitive Information Services, Industry Conferences, etc. In essence, the invention can be used as a tool to assist employees in retrieving and viewing specific portions of content on demand.

In this Business-to-Business service model, a user would enter a set of keywords in the profile that would be updated in the user profile database. In this case, the content captured will be dependent upon the business audience using the service.

In an intra-business application, the user may wish to combine sources from within the business and sources outside of the business. As an example a user may wish to see all clips dealing with the category "Virtual Private Networks." In this example, a business may have planned a new advertising campaign talking about "Virtual Private Networks" and have an advertisement available to its internal personnel. At the same time, there may be an internal training class that has been recorded and is available internally in which a section talks about "Virtual Private Networks." Again, this could be another content option captured by the invention. Also, one of this company's competitors may have provided a talk at an industry conference the day before about their solution for the "Virtual Private Network" area. As with the other content options, this too could be captured and available as a content option through the invention. Therefore, when our user begins a session using the invention and looks under the term "Virtual Private Networks," there could be numerous clips available from multiple sources (internal and external) to provide this user with a complete multimedia view of "Virtual Private Networks".

As an extra-business tool, the invention can provide businesses, their suppliers, their best customers, and all other members of communities of interests with specific targeted content clips that strengthen the relationships. These may include (but not be limited to) product details, new announcements, public relations messages, etc.

As further examples of applications of the invention, the following represent industry applications which may benefit from use of the invention.

In the financial industry, financial information can be available for both professionals and potential clients to receive late-breaking information on stocks, companies and the global markets. The information can be from a variety of sources such as Financial News Network, Bloomberg, CNN. etc. and allow users to identify key areas of interest and to continually be up to date.

In the advertising/announcements industry, advertisers would be able to target their ads to consumers based on peoples' preferences as expressed in their profiles. This is potentially a win/win situation because people would not be getting any more ads but they would be seeing more things that interest them. Advertisers could charge more for this targeted approach and thereby pay for any costs associated with the invention.

Similarly, large companies run TV advertisements for a multitude of products, services, target markets, etc. These companies could benefit by housing these commercials on an on-line database that can be accessible to their marketing staff, the advertising agencies, and clients interested in seeing particular commercials that used specific words or product names. The invention can then allow these commercials to be easily searched and accessed.

In the entertainment industry, the movie industry can use the invention to easily scan through archives of old and new movie footage that can be digitized and stored in a central repository. Sports highlights can be made available for particular games or events. Networks could maintain a library of indexed TV shows (e.g., PBS) where users can search for a particular episode/topic.

In the travel industry, searches can be done on new information in the travel industry such as airlines, causes of delays, etc. In addition, the invention can be used to provide key clips from specific resorts and other potential vacation destinations.

In the distance learning/education industry, a large variety of courses could be stored on-line. In many circumstances, a user may want to only see the salient points on a specific topic of interest. The invention can then play a key role in providing support to the user for access and retrieval of the key needed information.

For conferences and trade events, the invention can be an information dissemination tool for finding the latest information quickly when videos are captured of talks and demonstrations in key events.

Figure 6:
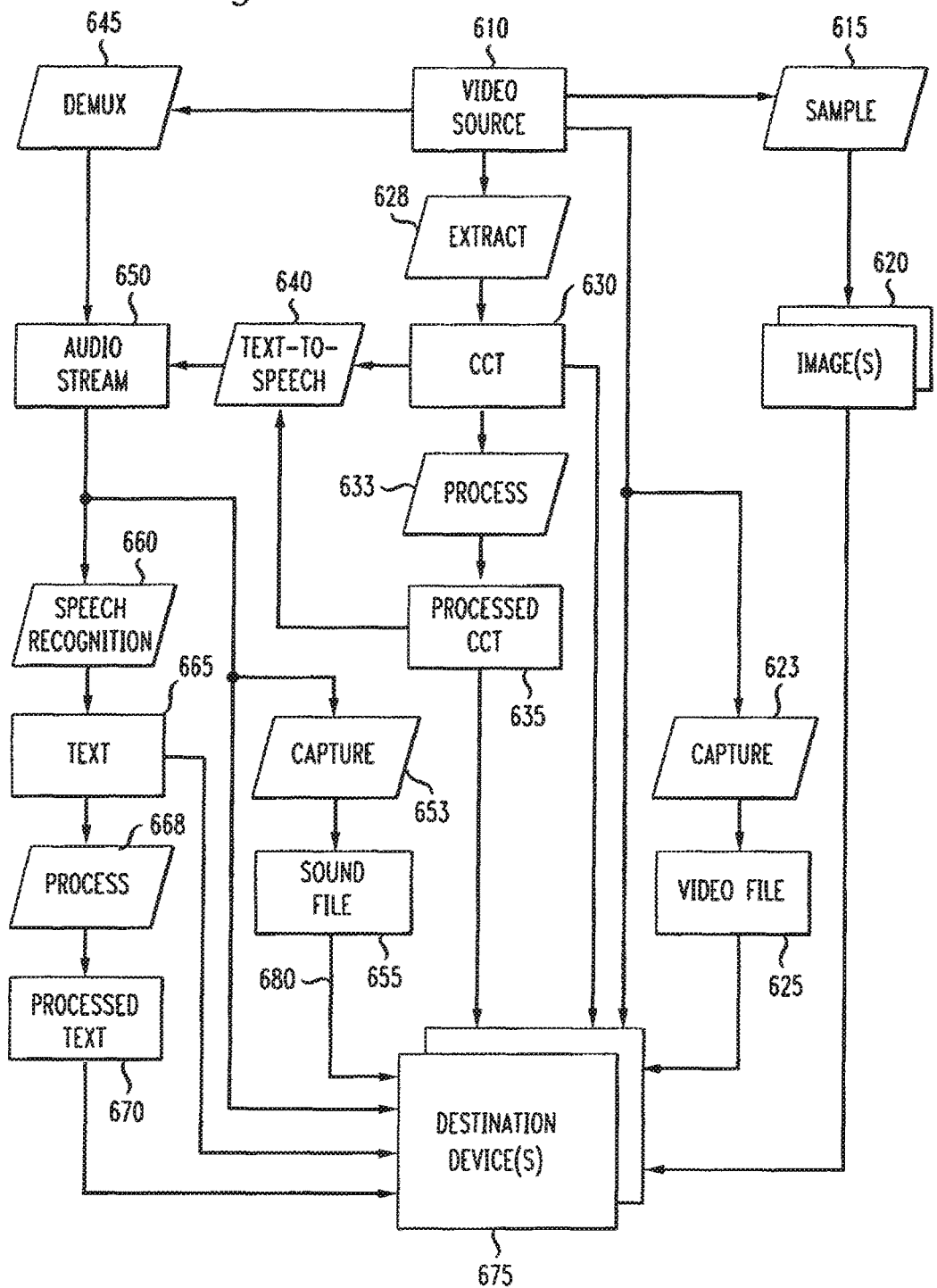
FIG. 6 is a flow diagram illustrating transformation of video source data according to one embodiment of the invention.

In one embodiment, at least portions of source video are transformed to other media formats to be delivered to a user instead of, or in addition to, the identified relevant portions of the source video. FIG. 6 is a flow diagram illustrating transformation of video source data 610 according to one embodiment of the invention. FIG. 6 illustrates several alternative transformation paths to deliver content of video source 610 to destination devices 675. As used herein, video source data 610 may be live streaming video, delayed streaming video, or stored video data.

Sampling function 615 processes video source data 610 to produce static images 620. In an embodiment where video source data 610 is streaming video, capture process 623 produces a video file 625 from video source data 610. Static images 620 or video files 625 are then delivered to destination devices 675.

FIG. 6 illustrates that demultiplexing process 645 processes video source file 610 to obtain or produce audio stream 650. The flowchart shows that there are at least four options for the delivery of audio stream 650. First, audio stream 650 can be delivered to destination devices 675 directly. Second, capture process 653 can create sound file 655 from audio stream 650 for eventual delivery to destination devices 675 via link 680. Third, speech recognition process 660 can process audio stream 650 to produce text 665. Text 665 can then be delivered to destination devices 675. Fourth, process 668 can further process text 665 to provide for correction of errors generated by the speech recognition process 660, or may, either in the alternative or in combination, translate text 665 to another language to produce processed text 670. Processed text 670 can then be delivered to destination devices 675.

In addition, FIG. 6 illustrates that extraction process 628 generates Closed Caption Text (CCT) 630 from video source data 610. Process 633 corrects for errors in CCT 630, provides language translation, and/or performs other translations to generate processed CCT 635. Processed CCT 635 may be delivered directly to destination devices 675. In the alternative, text-to-speech process 640 operates on either CCT 630 or processed CCT 635 to produce audio stream 650, with at least all transformation paths available as described above with regard to audio stream 650 for eventual delivery to destination devices 675. It is also possible to transform from video file 625 to sound file 655 via a demultiplexing process (not shown).

Destination devices 675 may be or include, for example, a personal computer (PC), a tablet PC, a personal digital assistant (PDA), a smart phone, or other device capable of receiving email.

Transformed content may be delivered to destination devices 675 according to alternative timing schemes. For example, CCT 630, processed CCT 635, audio stream 650, text 665, processed text 670 may be delivered in near real-time (e.g., where content delivery is delayed only by processing and communication overhead). In other embodiments, transformed content is stored for later delivery. Moreover, the timing for delivery of stored content may be according to a predetermined schedule, such as a set time of day. In addition, or in the alternative, content can be delivered according to a set interval of time, such as every hour or other fixed period of time. The predetermined schedule may be specified in the user's profile data. In addition, or in the alternative, the delivery of near real-time and/or stored content may be event-triggered. For instance, a user profile may specify that breaking headline news, special reports, and/or severe weather warnings trigger near real-time delivery of content separate from, or together with, related stored content.

Sample process 615, demultiplexing process 645, extraction process 628, text-to-speech process 640, speech recognition process 660, capture processes 623 and 653, and processes 633 and 668 may be performed on a server or other network-based host computer having access to video source data 610.

Figure 7:
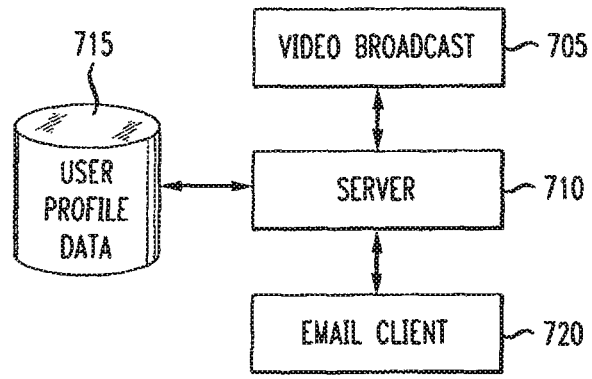
FIG. 7 is a block diagram of a functional architecture for delivering video content to an electronic mail client according to one embodiment of the invention.

FIG. 7 is a block diagram of a functional architecture for delivering video content to an electronic mail client according to one embodiment of the invention. In the illustrated embodiment, a server 710 is configured to identify relevant content in video broadcast 705 or other video source based on user profile data 715 and deliver the relevant content in the form of a video clip or link to an email client 720. As shown, server 710 provides not only access to user profile data 715, but also is configured to perform network-based processing to identify and deliver video content. User profile data 715 includes subjects (or topics) of information that are relevant to an end-user receiving email at email client 720. In addition, user profile data 715 includes an email address for a user. As will be discussed with reference to FIGS. 10-12B, email client 720 is alternatively a conventional email client or an enhanced email client.

Figure 8:
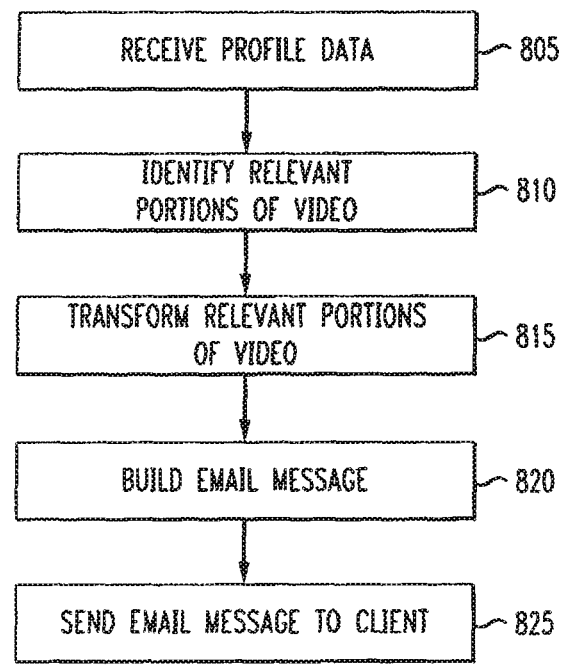
FIG. 8 is a flow diagram of a process for delivering video content to an electronic mail client according to one embodiment of the invention.

FIG. 8 is a flow diagram of a process for delivering video content to an electronic mail client according to one embodiment of the invention. In one embodiment, the process depicted in FIG. 8 is performed by the server 710. As illustrated, the process begins with receipt of previously-specified user profile data 715 in step 805. Server 710 identifies relevant portions of video broadcast 705 in step 810, based on topical information included in the user profile data 715. In step 815, server 710 optionally transforms relevant portions of the video broadcast 705 according to processes depicted in FIG. 6. For example, server 710 can generate closed caption text and/or image data based on video broadcast 705. Server 710 automatically builds an email message in step 820 without manual intervention, and sends the email message to email client 720 in step 825.

In one embodiment of step 820, one or more URL's or other links are included in the body of the email message pointing to a Web page containing the video content or to a Web page that causes a media player to be launched. In another embodiment of step 820, the video content is attached to the email message as one or more multimedia files. In yet another embodiment of step 820, one or more metafiles are attached to the email message.

Metafiles are small text files that contain information about media files including media file location, and optionally include information such as author or artist, start time, and duration. Examples of metafiles are MICROSOFT WINDOWS™ Advanced Stream Redirector (.asx) files, MICROSOFT WINDOWS™ Media Audio Redirector (.wax) files, MICROSOFT WINDOWS™ Media Redirector (.wvx) files, and REALNETWORKS™ Real Audio Metafile (.ram) files. The application of metafiles has many advantages. For example, because a metafile can specify several different locations for a media stream, the delivery of video content can be fault tolerant. In addition, a metafile can define a series of media streams to be played in sequence to form a larger, aggregate presentation from a collection of smaller video streams. Also, because metafiles can specify a start and a duration, shorter segments of interest can be specified within a longer media file. Moreover, since metafiles are small text files, emails having metafile attachments are more easily downloaded and stored than emails having large video files attachments, for example.

Figure 9:
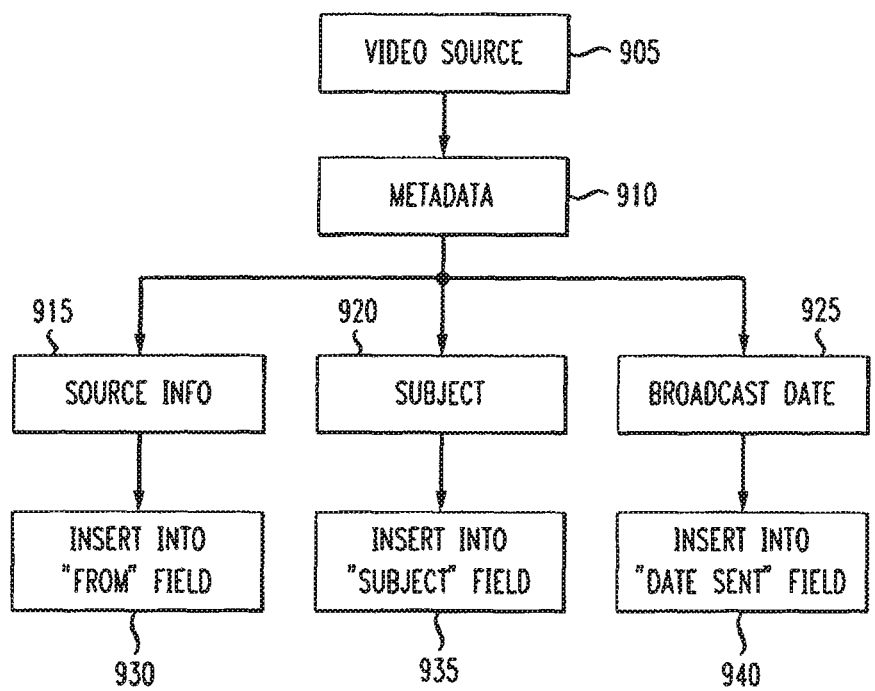
FIG. 9 is a flow diagram for mapping video metadata to an electronic mail message according to one embodiment of the invention.

FIG. 9 is a flow diagram for mapping video metadata to an electronic mail message according to one embodiment of the invention. In other words. FIG. 9 illustrates one embodiment of at least a portion of process step 820. As shown therein, metadata 910 is associated with video source data 905. Metadata 910 may include, for example, source information 915, subject matter 920, and broadcast date 925. As illustrated, in order to automatically generate an email message from metadata 910, source information 915 is inserted into a "from" field in step 930, subject 920 is inserted into a "subject" field in step 935, and broadcast date 925 is inserted into a "date sent" field in step 940. Accordingly, metadata 910 can be used to automatically generate an otherwise conventional email message.

Many alternatives to the process flow of FIG. 9 are possible. For example, where an email is being generated with multiple video clips from multiple sources, information pertaining to a service provider may be inserted into the "from" field instead of information pertaining to any single source. In addition, the broadcast date 925 can be inserted into the "subject" field of an electronic message. Moreover, any one or more of source information 915, subject 920 and broadcast date 925 can instead be automatically inserted into the body of an electronic message instead of into conventional email header fields.

Figure 10:
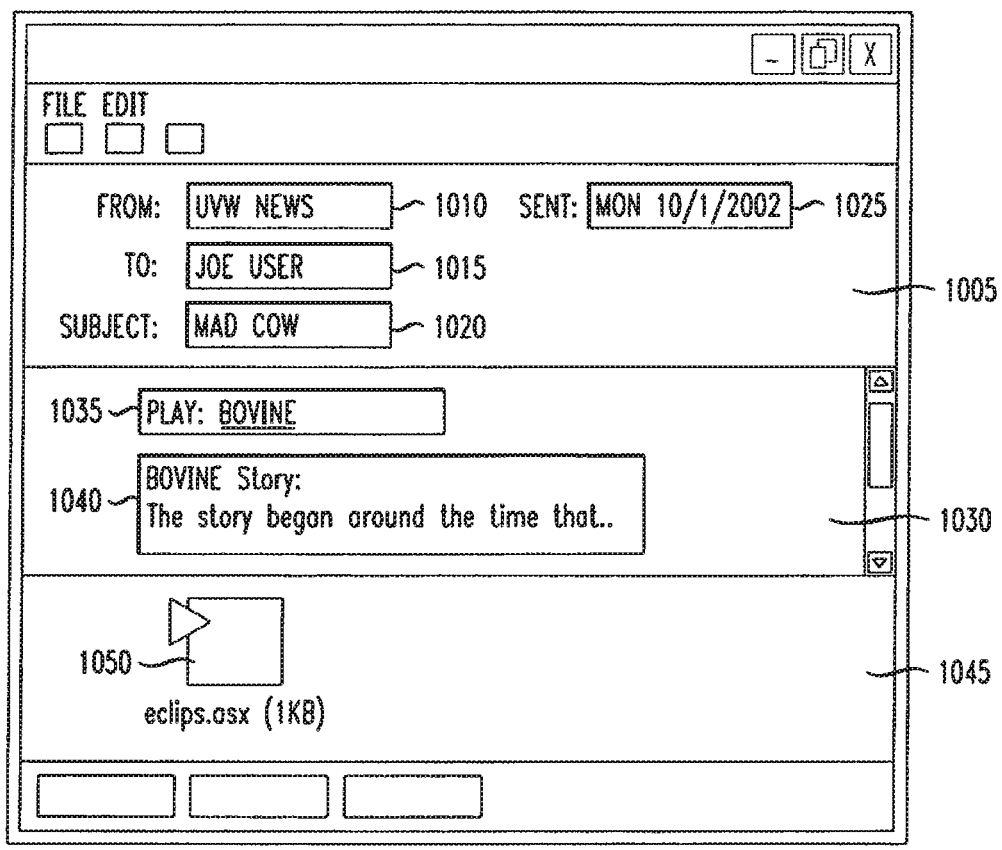
FIG. 10 is an illustration of an electronic mail message according to one embodiment of the invention.

FIG. 10 is an illustration of an electronic mail message according to one embodiment of the invention. FIG. 10 illustrates an email created by the process in FIG. 9. As shown, an email includes header information 1005. Source information 915, namely "UVW NEWS," has been inserted into "from" field 1010. Subject 920, namely "MAD COW," has been inserted into subject field 1020. Broadcast date 925, namely "MON Oct. 1, 2002," has been inserted into sent field 1025. As also shown, "JOE USER" has been inserted into "to" field 1015. In one embodiment, sent field 1025 also includes the time. In addition to, or in the alternative to sent field 1025, header information 1005 includes a received field (not shown) to display the date and/or time the email was received.

As illustrated, the email message in FIG. 10 has a body 1030 that includes text link 1035 and CCT 1040. The word BOVINE in text link 1035 can be hyperlinked to access a video clip related to MAD COW from a Web page having an embedded media player, for example, or can be played with a media player local to the email client 720. Body 1030 optionally includes multiple text links 1035 for access to a corresponding quantity of video clips. CCT 1040 includes CCT that has been created from a relevant video source. In the alternative, or in combination, CCT 1040 includes processed CCT as described with reference to FIG. 6 above.

FIG. 10 also illustrates an attachment area 1045. As shown, attachment area 1045 includes an Icon for a metafile 1050. In an alternative embodiment, attachment area 1045 will indicate one or more attached media files (not shown). Various combinations of text links 1035 in body 1030, metafile(s) 1050 in attachment area 1045 and media file(s) (not shown) in attachment area 1045 are possible.

Figure 11:
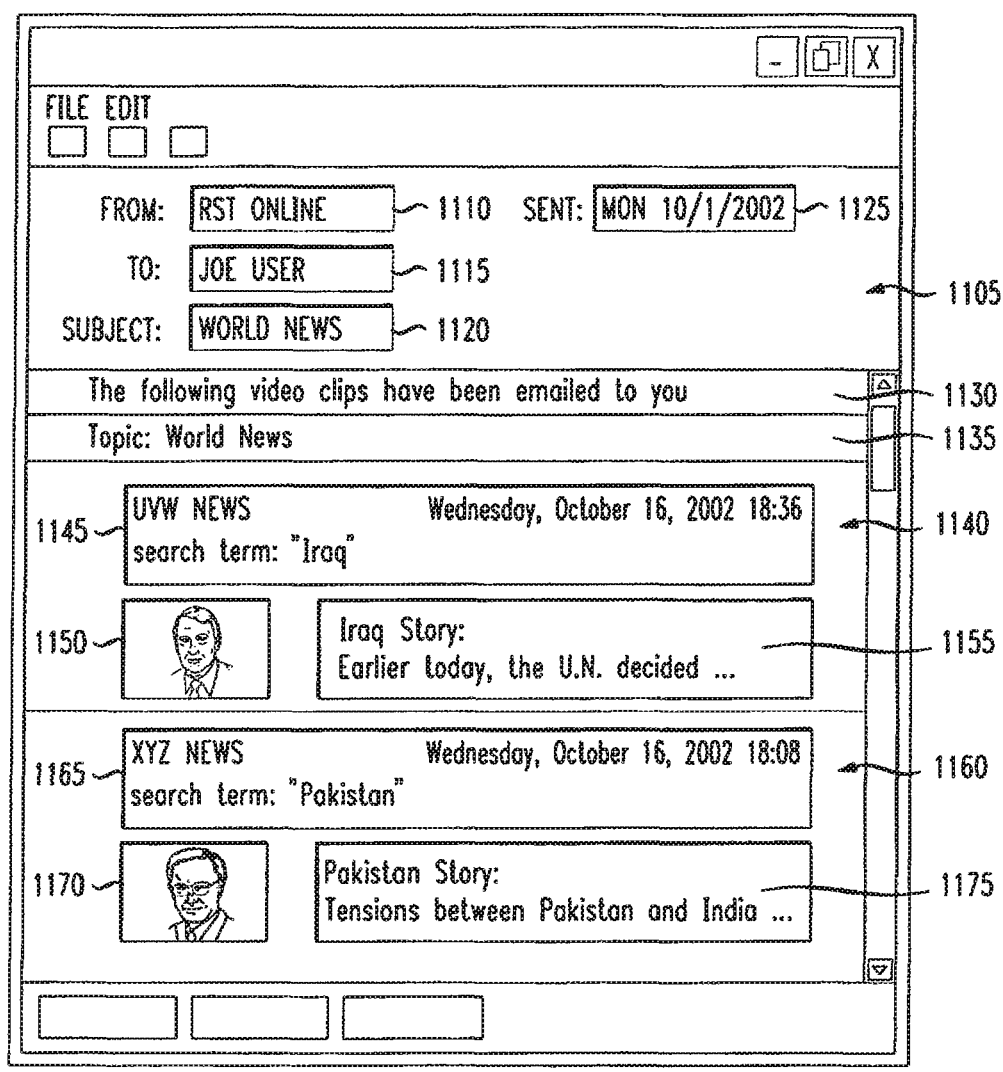
FIG. 11 is an illustration of an electronic mail message according to another embodiment of the invention.

FIG. 11 is an illustration of an electronic mail message according to another embodiment of the invention. As shown, an email includes header information 1105. Service provider information "RST ONLINE," has been inserted into "from" field 1110; "WORLD NEWS," has been inserted into subject field 1120; and "MON Oct. 1, 2002," has been inserted into date sent field 1125. As also shown, "JOE USER" has been inserted into "to" field 1115.

As illustrated in FIG. 11, an automatically generated email message has a message body including delivery message area 1130, topic area 1135, and content areas 1140 and 1160. As shown, video clip headers 1145 and 1165 each include source information, a search term and a date and time of original broadcast. Other video clip header information can be used. Content areas 1140 and 1160 also include thumbnails 1150 and 1170, respectively, which are representative of the content of the delivered video clips. In one embodiment, a user selects thumbnails 1150 and/or 1170 to launch a media player local to email client 720 to play at least a portion of relevant source video. Alternatively, or in combination, when the user selects thumbnails 1150 and/or 1170, the email client 720 links to a Web page having an embedded media player to play at least a portion of relevant source video. Content areas 1140 and 1160 optionally include CCT 1155 and 1175, respectively, in addition to, or in the alternative of thumbnails 1150 and 1170.

In one embodiment, the email message illustrated in FIG. 11 includes an attachment area having one or more metafiles 1050 and/or one or more media files. In the alternative, or in combination with other features, an embodiment of the email message illustrated in FIG. 11 includes one or more text links 1035. Features of the email in FIG. 11 are optional, except that the email should include sufficient header information for delivery, and some form of content derived from the relevant source video, or links thereto.

Advantageously, the email messages illustrated in FIGS. 10 and 11 can be delivered and viewed using conventional email servers and clients.

Figure 12A:
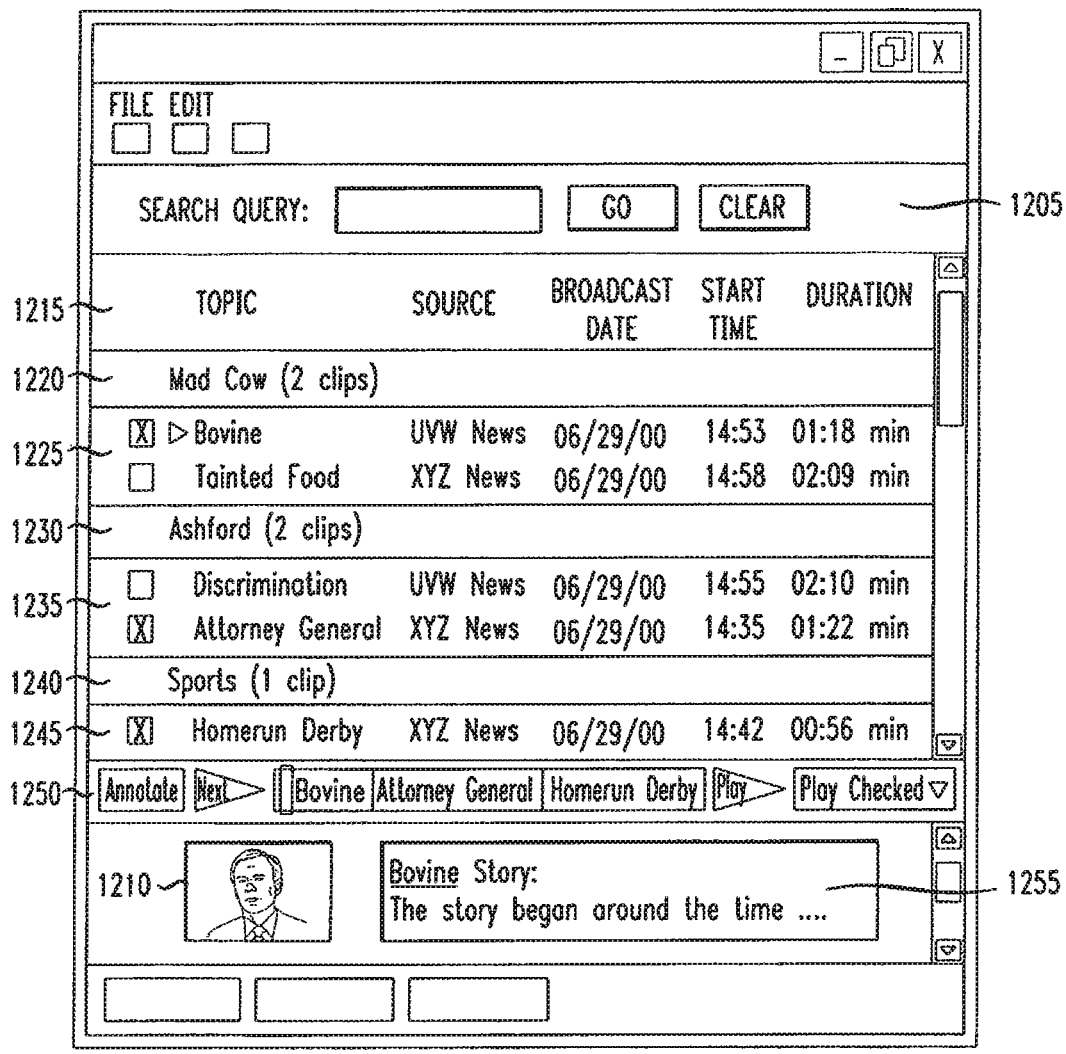
FIG. 12A is a an illustration of an exemplary graphical user interface for managing and viewing electronic mail messages having video content according to one embodiment of the invention.
Figure 12B:
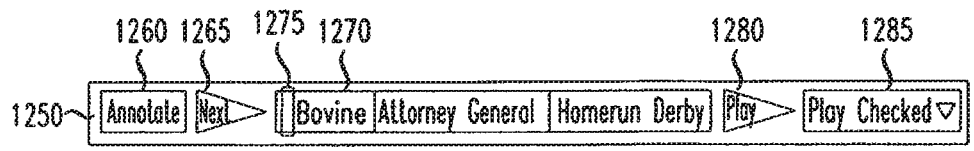
FIG. 12B is an illustration of a portion of the graphical user interface in FIG. 12A.

FIG. 12A is an illustration of an exemplary graphical user interface (GUI) for managing and viewing electronic mail messages having video content according to one embodiment of the invention. The GUI illustrated in FIG. 12A is part of an enhanced email client 720 adapted for the management and presentation of video content delivered by email. As illustrated, an enhanced email client 720 has a search area 1205. In one embodiment, search area 1205 is used for updating user profile data 715. In another embodiment, search area 1205 is used for searching within video content stored on email client 720.

The GUI of FIG. 12A can be viewed as having a management area and a viewing area. As illustrated, the management area includes headings 1215, topic listings 1220, 1230 and 1240, and video clip data 1225, 1235 and 1245. The viewing area includes media control bar 1250, window 1210 and CCT 1255. By adjusting a boundary between the management area and the viewing area, a user can expand the management area while deleting, selecting, or otherwise managing the video clips, then expand the viewing area while viewing thumbnails, video, CCT, or otherwise viewing video and/or other multimedia content.

Headings 1215 provide a framework for summarizing video clips delivered to the email client 720. Other information could optionally be used. For example, service provider, file size, or other information can be displayed for each video clip according to alternative headings 1215. As shown, video clip data 1225, 1235 and 1245 include check boxes for the selection of one or more video clips to be played. Other methods of selection could also be used. For example, a user could click on the name of a video clip or provide a verbal command indicating the video clip(s) to be played.

Media control bar 1250 provides controls for playing one or more selected video clips. Media control bar 1250 allows for navigation between video clips and/or topics. In addition, or in the alternative, media control bar 1250 allows for multiple video clips to be queued for presentation in a predetermined sequence. Exemplary features of media control bar 1250 are labeled in FIG. 12B. As shown therein, media control bar 1250 includes annotate button 1260, next button 1265, play bar 1270 having a slider 1275, play button 1280 and pull down menu 1285.

Annotate button 1260 allows a user to associate comments or other metadata with video clips in the management area. Next button 1265 skips over the video clip queued up or being played in the viewing area. Play bar 1270 is a graphical representation of a series of selected video clips. As illustrated, play bar 1270 represents video clips Bovine, Attorney General, and Homerun Derby that are selected in the management area. In one embodiment, play bar 1270 is color coded according to corresponding colors associated with the selected video clips anchor topics in the management area. Play bar 1270 has a slider 1275 to illustrate progression of play through each of the clips illustrated in play bar 1270. As shown, the slider 1275 indicates that the viewing area is playing an early portion of the Bovine video clip. In one embodiment, play bar 1270 can also be used to advance or retard play within the series of selected video clips. For example, a user could move slider 1275 from its illustrated position to jump to a middle portion of the Homerun Derby clip, for instance. Play button 1280 begins or resumes play of one or more video clips according to the menu item selected in pull down menu 1285. In addition to "Play Checked" illustrated in FIGS. 12A and 12B, pull down menu 1285 could contain options such as "Play All," "Play One Clip Per Topic," or other alternatives.

In one embodiment, window 1210 is a thumbnail image that is replaced by a video thumbscreen while selected video clips are being played. In another embodiment, one or more local media players are launched to present the selected video clips to the user. In the alternative or in combination, selection of window 1210 can link to a Web page having an embedded media player for presenting the selected video clips to the user. CCT 1255 provides CCT or processed CCT corresponding to the thumbnail image or video thumbscreen in window 1210. In a preferred embodiment, CCT 1255 automatically scrolls in synchronization with a video thumbscreen in window 1210.

In conclusion, a service for providing personalized multimedia assets such as electronic clips from video programs, based upon personal profiles, has been presented. In one embodiment, it uses text to ascertain the appropriate clips to extract and then assembles these clips into a single session. Thus, users only see the specific portions of videos that they desire. Therefore, users do not have to undertake the arduous task of manually finding desired video segments, and further don't have to manually select the specified videos one at a time. Rather, the invention generates all of the desired content automatically. Moreover, one embodiment of the invention provides an improved system and method for automatically delivering video content via email without the delay and expense of manual alternatives.

While this invention has been described in various explanatory embodiments, other embodiments and variations can be effected by a person of ordinary skill in the art without departing from the scope of the invention.

What is claimed is:

1. A method for operation of a video server comprising:
receiving a source video comprising a plurality of different programs;
analyzing the source video to produce a plurality of video segments of the source video;
comparing the plurality of video segments of the source video to a profile of a user;
identifying a set of video segments of the plurality of video segments of the source video based on the comparing;
transforming the set of video segments for transmission to a device associated with the user to generate a transformed set of video segments;
generating an electronic message containing the transformed set of video segments; and
transmitting the electronic message to the device associated with the user for display of the transformed set of video segments as a graphical representation including a media control bar comprising a play bar depicting a plurality of representations, each of the plurality of representations comprising color coded summary information corresponding to a related one of the plurality of different programs, the plurality of representations depicted in a predetermined order queued for presentation, each of the plurality of representations related to a respective one of the transformed set of video segments.

2. The method of claim 1, wherein the graphical representation further comprises an annotate button for associating a user comment with one of the transformed set of video segments.

3. The method of claim 2, the analyzing further comprising:
classifying each particular one of the plurality of video segments based on content of the each particular one of the plurality of video segments, wherein the comparing comprises comparing keywords of the profile to a classification of a respective video segment.

4. The method of claim 1, wherein the source video is selected based on an interest of a target audience comprising the user.

5. The method of claim 1, wherein the identifying is further based on criteria specified by the user.

6. An apparatus comprising:
a processor; and
a memory to store computer program instructions, the computer program instructions when executed on the processor cause the processor to perform operations comprising:
receiving a source video comprising a plurality of different programs;
analyzing the source video to produce a plurality of video segments of the source video;
comparing the plurality of video segments of the source video to a profile of a user;
identifying a set of video segments of the plurality of video segments of the source video based on the comparing;
transforming the set of video segments for transmission to a device associated with the user to generate a transformed set of video segments;
generating an electronic message containing the transformed set of video segments; and transmitting the electronic message to the device associated with the user for display of the transformed set of video segments as a graphical representation including a media control bar comprising a play bar depicting a plurality of representations, each of the plurality of representations comprising color coded summary information corresponding to a related one of the plurality of different programs, the plurality of representations depicted in a predetermined order queued for presentation, each of the plurality of representations related to a respective one of the transformed set of video segments.

7. The apparatus of claim 6, wherein the graphical representation further comprises an annotate button for associating a user comment with one of the transformed set of video segments.

8. The apparatus of claim 7, the analyzing further comprising:
classifying each particular one of the plurality of video segments based on content of the each particular one of the plurality of video segments, wherein the comparing comprises comparing keywords of the profile to a classification of a respective video segment.

9. The apparatus of claim 6, wherein the source video is selected based on an interest of a target audience comprising the user.

10. The apparatus of claim 6, wherein the identifying is further based on criteria specified by the user.

11. A non-transitory computer readable medium storing computer program instructions, which, when executed on a processor, cause the processor to perform operations comprising:
receiving a source video comprising a plurality of different programs;
analyzing the source video to produce a plurality of video segments of the source video;
comparing the plurality of video segments of the source video to a profile of a user;
identifying a set of video segments of the plurality of video segments of the source video based on the comparing;
transforming the set of video segments for transmission to a device associated with the user to generate a transformed set of video segments;
generating an electronic message containing the transformed set of video segments; and
transmitting the electronic message to the device associated with the user for display of the transformed set of video segments as a graphical representation including a media control bar comprising a play bar depicting a plurality of representations, each of the plurality of representations comprising color coded summary information corresponding to a related one of the plurality of different programs, the plurality of representations depicted in a predetermined order queued for presentation, each of the plurality of representations related to a respective one of the transformed set of video segments.

12. The non-transitory computer readable medium of claim 11, wherein the graphical representation further comprises an annotate button for associating a user comment with one of the transformed set of video segments.

13. The non-transitory computer readable medium of claim 12, the analyzing further comprising:
classifying each particular one of the plurality of video segments based on content of the each particular one of the plurality of video segments, wherein the comparing comprises comparing keywords of the profile to a classification of a respective video segment.

14. The non-transitory computer readable medium of claim 11, wherein the identifying is further based on criteria specified by the user.

* * * * *